United States Patent [19]

Itoh et al.

[11] 4,123,835

[45] Nov. 7, 1978

[54] METHOD FOR ASSEMBLING A FUEL PUMP TO AN INTERNAL COMBUSTION ENGINE

[75] Inventors: Yoshiharu Itoh, Kariya; Makoto Iwatsuki, Okazaki; Kazuhiro Suzuki, Gamagori; Tatuya Seko, Aichi, all of Japan

[73] Assignee: Nippondenso Co., Ltd., Kariya, Japan

[21] Appl. No.: 809,650

[22] Filed: Jun. 24, 1977

[30] Foreign Application Priority Data

Aug. 6, 1976 [JP] Japan .......................... 51-105754[U]

[51] Int. Cl.$^2$ .............................................. B23P 15/00

[52] U.S. Cl. ................................ 29/156.4 R; 29/407; 29/428

[58] Field of Search .................. 29/156.4 R, 407, 428, 29/526, 423, 464; 123/90.31, 139 AA, 139 AG, 139 AR, 139 AD, 139 AE, 139 AP, 139 B, 32 JT, 198 C

[56] References Cited

U.S. PATENT DOCUMENTS

| | | | |
|---|---|---|---|
| 953,424 | 3/1910 | Lindsay | 123/90.31 |
| 2,414,518 | 1/1947 | Garday | 29/156.4 R |
| 3,620,554 | 11/1971 | Ward et al. | 29/526 |

*Primary Examiner*—C.W. Lanham

*Assistant Examiner*—Daniel C. Crane

*Attorney, Agent, or Firm*—Cushman, Darby & Cushman

[57] ABSTRACT

A fuel pump has a cam shaft for actuating a pump element to deliver fuel under pressure to an engine. One end of the cam shaft protrudes outside of a pump housing, to which a coupling block is fixedly secured. At least two axially extending threaded holes are formed on the coupling block, and also at least two axially extending through holes are formed on a driving gear for engaging a ring gear of the engine. A head-less locking bolt is screwed into one of threaded holes until the front end thereof abut on the pump housing so that the coupling block is held at a proper position. Thereafter, the driving gear is mounted to the coupling block so that the rear end of the head-less bolt is inserted into one of the through holes and at the same time the driving gear engages with the ring gear of the engine in order to couple the fuel pump to the engine with a synchronous relationship. A fixing bolt is screwed into the other threaded hole through the other through hole for fixedly connecting the driving gear to the coupling block. Finally, the head-less bolt is taken off from the coupling block releasing the locking between the coupling block and the pump housing.

1 Claim, 4 Drawing Figures

METHOD FOR ASSEMBLING A FUEL PUMP TO AN INTERNAL COMBUSTION ENGINE

BACKGROUND OF THE INVENTION

The present invention relates to a fuel pump for an internal combustion engine, particularly to a fuel pump of the type having a coupling block supported on a cam shaft outside of a pump housing, the coupling block being coupled to the engine by means of a driving gear with a synchronous relationship. The present invention also relates to a method for assembling the fuel pump to the engine with the synchronous relationship.

When a fuel pump is assembled to an internal combustion engine, a cam shaft of the fuel pump must be placed and held in a proper position and coupled to a ring gear supported on an engine crankshaft keeping the above proper position, so that fuel injection may be proceeded at a proper timing in synchronism with the rotation of the engine.

In a conventional fuel pump, therefore, a mark is formed on both a pump housing and a cam shaft (or a coupling block), and the cam shaft (coupling block) is rotated, when assembling, until the mark on the cam shaft coincides with the mark on the pump housing and then the coupling block is coupled with the ring gear supported on a crankshaft of the engine through a driving gear, whereby the cam shaft and crankshaft are synchronously connected with each other.

It is very troublesome, however, that the cam shaft of the fuel pump must be rotated till a proper position and held on the position during assembling steps of the fuel pump. As the case may be, it becomes impossible to proceed with the above assembling steps when the marks on either the pump housing or the cam shaft is taken cover by other engine equipments installed in an engine room.

SUMMARY OF THE INVENTION

It is, therefore, an object of the present invention to overcome the above drawbacks and to provide a novel and effective locking device for a coupling block of a fuel pump for holding the same at a proper position during the assembling steps therefor and also to provide a method for assembling the fuel pump to the engine.

According to the locking device of the present invention, the device holds the cam shaft at the proper position during coupling the coupling block on the cam shaft to the ring gear on the engine crankshaft by means of a driving gear, thus enabling the easy and quick coupling.

Other and further objects, features and advantages of the invention will appear more fully from the following description.

DETAILED DESCRIPTION OF THE PREFERRED EMBODIMENT

Figure 1:
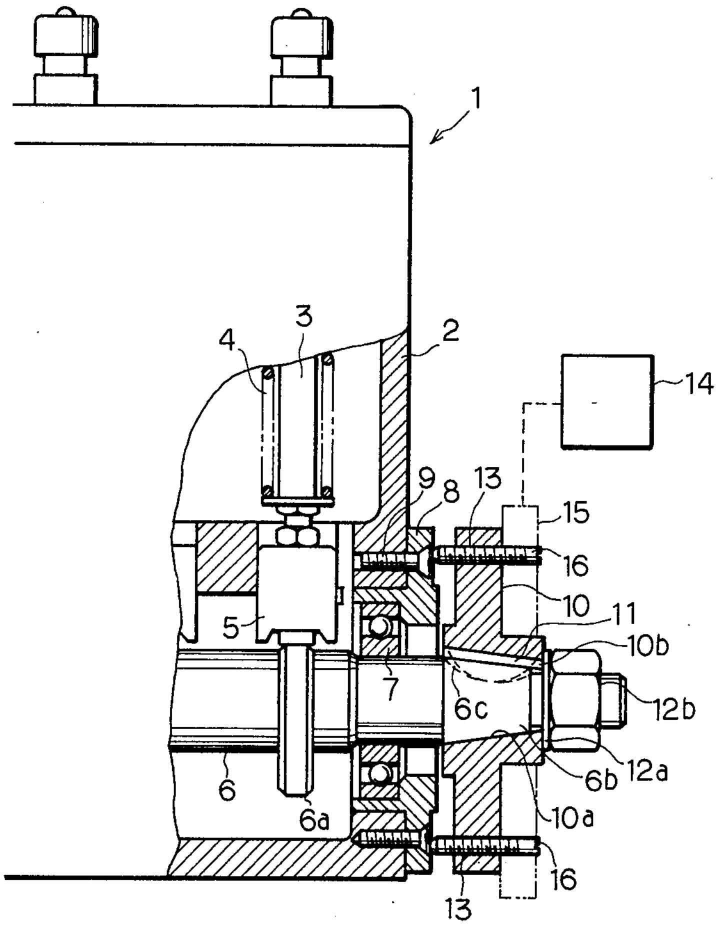
FIG. 1 is an elevational view partly in section showing a fuel pump provided with a locking device according to the present invention.
Figure 2:
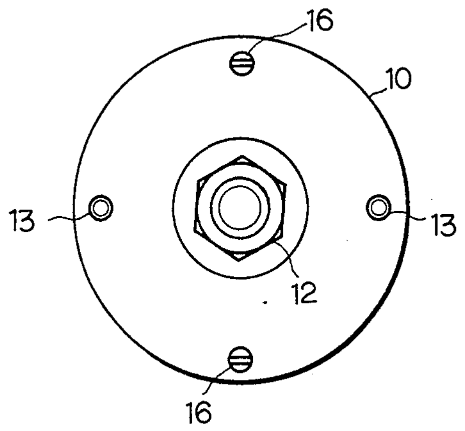
FIG. 2 is a front view of a coupling block in FIG. 1.

In FIGS. 1 and 2, a fuel pump generally designated by numeral 1 is indicated by a partly sectional view, which shows a last condition of the fuel pump 1 prior to being assembled to an internal combustion engine 14.

The fuel pump 1 comprises within a pump housing 2 a plurality of pump elements each of which has a plunger 3, a coil spring 4 and a tappet 5. Those pump elements operate in a well-known usual manner to distribute or deliver fuel under pressure to the engine 14 in accordance with a rotation of a cam shaft 6 and in shychronism with the engine. The tappet 5 is biased by the spring 4 downwardly and held in a sliding contact with a cam surface 6*a* of the cam shaft 6.

The cam shaft 6 is rotatably supported in the pump housing 2 by a bearing 7 and a bearing cover 8, with one end of the shaft 6 being protruded outside of the pump housing 2.

The bearing cover 8 is fixedly secured to the pump housing 2 by means of screws 9 for holding the bearing 7 in place.

A tapered portion 6*b* is formed on the protruded end of the cam shaft 6, on which an axially extending straight groove 6*c* is formed.

A circular coupling block 10 is formed with a central tapered hole 10*a*, on which an axially extending straight groove 10*b* is formed. The tapered portion 6*b* of the cam shaft 6 is inserted into the tapered hole 10*a* of the coupling block 10 and the block 10 is fixedly secured to the cam shaft 6 by means of a washer 12*a* and a nut 12*b*, wherein a semi-circular key 11 is disposed in both straight grooves 6*c* of the shaft 6 and 10*b* of the block 10 in order to prevent a relative movement therebetween.

The coupling block 10 is provided with a plurality of axially extending threaded holes 13 which are circumferentially spaced at equal intervals as clearly seen from FIG. 2, wherein the number of holes are four, however, the number thereof may not be limited.

The threaded holes 13 are formed, on one hand, for the purpose of coupling the block 10 with a driving gear 15 for engaging a ring gear supported on an engine crankshaft of the engine 14, and on the other hand for the purpose of locking the block 10 in place with respect to the pump housing 2 while the driving gear 15 is coupled to the coupling block 10.

Locking bolts 16 of the type having no bolthead are screwed into some of the threaded holes 13 till the front ends thereof abut on the outside surface of the bearing cover 8. Thus, the coupling block 10 is prevented from rotating and is held in a proper position.

In the embodiment shown, two locking bolts 16 are used, however the number of locking bolts 16 may not be limited to two.

As above, the coupling block 10 is held in the proper position where a mark (not shown) formed on the coupling block 10 (or the cam shaft 6) coincides with a mark (not shown) formed on the pump housing 2 (or the bearing cover 8). Since the locking step of the block 10 to the pump housing 2 by means of head-less bolts 16 can be carried out before the pump housing 2 is mounted in an engine room, the locking step can be easily done.

Figure 3:
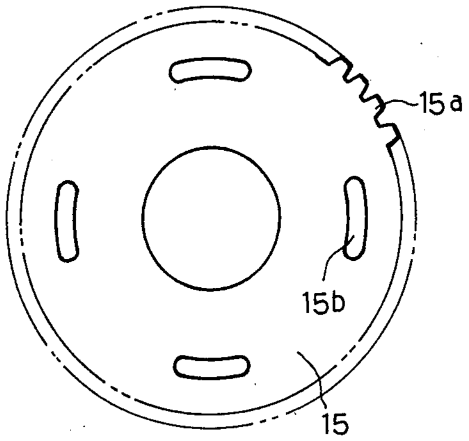
FIG. 3 is a front view of a driving gear.
Figure 4:
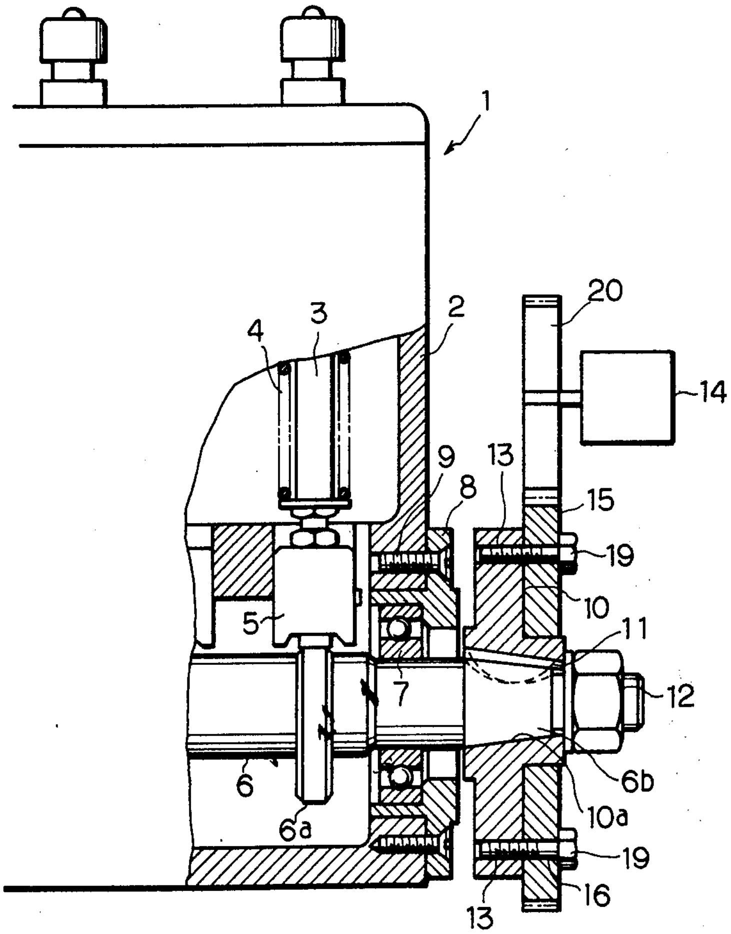
FIG. 4 is an elevational view partly in section showing the fuel pump coupled to an engine.

The driving gear 15 for synchronously engaging the coupling block 10 to the ring gear of the engine is shown in FIG. 3. A plurality of teeth 15*a* are formed at the outer periphery thereof for engaging the ring gear 20 supported on the engine crankshaft as shown in FIG. 4. A plurality of arcuate (through) holes 15*b* which are also axially extending are also formed thereon at circumferentially equal intervals, into which fixing bolts 19 would be inserted. The shape of the through hole 15*b* may not be limited to the arcuate configuration. A diameter of a circle formed by the plurality of arcuate holes 15*b* is of course the same as that of a circle formed by the plurality of threaded holes 13 on the coupling block 10.

Now, assembling steps of the driving gear 15 to the coupling block 10 will be explained.

As explained above, since the coupling block 10 is held in the proper position by the head-less bolts 16, the position of the block 10 with respect to the pump housing 2 is kept even after the pump housing is mounted in the engine room, where the engine 14 has been already mounted.

The driving gear 15 is assembled to the coupling block 10 in such a manner that the protruding (rear) ends of the head-less bolts 16 are inserted into the arcuate holes 15*b* and at the same time the teeth 15*a* of the driving gear 15 are engaged with that of the ring gear 20 supported on the engine crankshaft, during which the ring gear 20 is, of course, held at its proper position for making possible the synchronous coupling between engine 14 and the fuel pump 1.

During the above assembling step, since the coupling block 10 is held in the proper position by the head-less bolts 16, synchronizing operation (or step) can be easily promoted.

When the driving gear 15 is assembled (mounted) to the coupling block 10, fixing bolts 19 are screwed through the arcuate through hole into the threaded holes 13 which are not screwed with the head-less bolts 16. After screwing the fixing bolt or bolts 19, the head-less bolts 16 are taken off from the threaded holes 13 for releasing the locking between the coupling block 10 and the pump housing 2 and other fixing bolts 19 are then screwed into those threaded holes 13.

It should be noted that in the above embodiment the threaded holes 13 on the coupling block 10 are used as that for the head-less locking bolts 16, however, one or more threaded holes may be formed on the coupling block 10 for the purpose of screwing the head-less locking bolt or bolts only. At that time, it is easily understood that one or more (arcuate) through holes corresponding to the locking bolts must be formed on the driving gear 15 for taking off the locking bolts therethrough.

What is claimed is:

1. A method for assembling a driving gear to a coupling block in a fuel pump for an internal combustion engine comprising;

a pump housing having a pump element for delivering fuel under pressure to the engine and also having a cam shaft for actuating said pump element, one end of said cam shaft protruding outside of said pump housing;

a coupling block fixedly secured to the protruded end of said cam shaft, said coupling block being formed with at least two axially extending threaded holes; and a driving gear coupled to said coupling block and for engaging a ring gear of the engine, said driving gear being formed with at least two through holes, said method comprising the steps of:

screwing a head-less bolt into one of said threaded holes of the coupling block till the front end thereof abut on said pump housing to thereby hold said coupling block at its proper position;

mounting said driving gear to said coupling block in such a manner that the rear end of said head-less bolt is inserted into one of said through holes and at the same time said driving gear is engaged with a ring gear of the engine;

fixing said driving gear to said coupling block by means of a fixing bolt by screwing said fixing bolt through the other of said through hole into the other of said threaded hole; and taking off said head-less bolt from said threaded hole to release the locking between said coupling block and said pump housing.

* * * * *